United States Patent
Mittmann et al.

(10) Patent No.: US 7,461,464 B2
(45) Date of Patent: Dec. 9, 2008

(54) POSITION MEASURING ARRANGEMENT

(75) Inventors: Rudolf Mittmann, Tacherting (DE); Erich Strasser, Trostberg (DE)

(73) Assignee: Johannes Heidenhain, GmbH, Traunreut (DE)

( * ) Notice: Subject to any disclaimer, the term of this patent is extended or adjusted under 35 U.S.C. 154(b) by 111 days.

(21) Appl. No.: 11/704,511

(22) Filed: Feb. 9, 2007

(65) Prior Publication Data

US 2007/0186431 A1    Aug. 16, 2007

(30) Foreign Application Priority Data

Feb. 15, 2006  (DE) ................ 10 2006 007 184

(51) Int. Cl.
  *G01D 5/244* (2006.01)
  *G01D 5/347* (2006.01)
(52) U.S. Cl. ............... 33/706; 33/707; 702/94
(58) Field of Classification Search ......... 33/1 PT, 33/706, 707, 708; 250/231.13, 231.14, 231.16, 250/231.18, 237 G; 356/616, 617, 618, 619; 702/94, 150, 158
See application file for complete search history.

(56) References Cited

U.S. PATENT DOCUMENTS

| | | | |
|---|---|---|---|
| 5,023,434 A | 6/1991 | Lanfer et al. | |
| 5,068,529 A | 11/1991 | Ohno et al. | |
| 5,563,408 A | 10/1996 | Matsumoto et al. | |
| 5,754,568 A | 5/1998 | Braasch | |
| 6,742,275 B2 | 6/2004 | Mayer et al. | |
| 6,789,042 B2 | 9/2004 | Boyton | |
| 7,013,575 B2 | 3/2006 | Strasser et al. | |
| 7,164,120 B2 | 1/2007 | Strasser | |
| 7,227,125 B2 * | 6/2007 | Sannomiya et al. | .... 250/231.13 |
| 2004/0129870 A1 | 7/2004 | Strasser | |
| 2004/0181958 A1* | 9/2004 | Rodi | ........... 33/706 |

FOREIGN PATENT DOCUMENTS

| | | | |
|---|---|---|---|
| DE | 39 42 625 A1 | | 6/1990 |
| DE | 38 25 097 C2 | | 9/1992 |
| DE | 42 09 629 A1 | | 10/1992 |
| DE | 43 09 863 C1 | | 6/1994 |
| DE | 102 44 234 A1 | | 3/2004 |
| DE | 10244923 A1 | * | 4/2004 |
| EP | 0 789 226 B1 | | 6/2001 |
| JP | 2007218907 A | * | 8/2007 |
| WO | WO 9108493 A2 | * | 6/1991 |
| WO | WO 02/01160 A1 | | 1/2002 |
| WO | WO 03/060431 A1 | | 7/2003 |

* cited by examiner

*Primary Examiner*—R. A. Smith
(74) *Attorney, Agent, or Firm*—Brinks Hofer Gilson & Lione

(57) ABSTRACT

A position measuring arrangement that includes an arrangement of scanning elements for scanning an absolute code and a selection system for selecting scanning signals from the arrangement of scanning elements by a first method of selection and a second method of selection different from the first method of selection. The position measuring arrangement further includes a decoding device for forming a first absolute measured position value from the scanning signals selected by the selection system when the first method of selection is applied to the selection system and a second absolute measured position value from the scanning signals selected by the selection system when the second method of selection is applied.

17 Claims, 5 Drawing Sheets

POSITION MEASURING ARRANGEMENT

Applicants claim, under 35 U.S.C. § 119, the benefit of priority of the filing date of Feb. 15, 2006 of a German patent application, copy attached, Serial Number 10 2006 007 184.0, filed on the aforementioned date, the entire contents of which is incorporated herein by reference.

BACKGROUND OF INVENTION

1. Field of the Invention

The present invention relates to a position measuring arrangement for the determination of an absolute position. The present invention furthermore relates to a method for operating an absolute position measuring arrangement.

2. Discussion of Related Art

Position measuring arrangements in the form of angle- and length-measuring arrangements are employed in the machine tool industry and other manufacturing, handling and testing systems. A high functional dependability becomes of increased importance in connection with all uses, because faulty operation can cause considerable damage.

Absolute position measuring arrangements, which can provide correct position information in any relative position, even immediately following an interruption in the energy supply, are being increasingly employed for position measuring. In this case, the absolute position is represented by a single-track code arranged in a particularly space-saving manner of code elements arranged one behind the other in the measuring direction. Here, the code elements are arranged behind each other in a pseudo-random manner, so that a definite number of successive code elements respectively constitute a code pattern or bit pattern, which definitely defines the absolute position as a code word. A new code word is already formed in the course of the displacement of the scanning device by a single code element, and a sequence of different code words is available over the entire measuring range to be recorded. Such a sequential code is called a chain code or pseudo-random code.

A number of measures for assuring the dependable readout of the code elements have become known in the prior art. These measures have in common that it is intended to assure that the code elements are scanned within the definite range, i.e. not in the transition area to the adjacent code elements. A selection information is obtained for this from an auxiliary track, or from the code track itself, by which the scanning elements are selected for assured scanning and generation of a code word. The binary information from the selected scanning elements is provided to a decoding device for forming the instantaneous absolute position. Stored assignment tables or generators are used as decoding device.

Such position measuring arrangements and methods are described, for example, in DE 42 09 629 A1, DE 39 42 625 A1, DE 43 09 863 C1, DE 38 25 097 C2 and WO 03/060431 A1.

It is customary to employ redundant scanning units for increasing the operational dependability and for detecting faulty operation of absolute position measuring arrangements. Such a position measuring arrangement is described in EP 0 789 226 B1. Several spaced apart code words are scanned and compared with each other. The hardware outlay is increased by this multiple redundancy, and connected therewith as the costs as well.

OBJECTS AND SUMMARY OF THE INVENTION

It is therefore an object of the present invention to dependably discover a faulty operation of the measuring arrangement by as low as possible an outlay for hardware.

This object is attained by a position measuring arrangement that includes an arrangement of scanning elements for scanning an absolute code and a selection system for selecting scanning signals from the arrangement of scanning elements by a first method of selection and a second method of selection different from the first method of selection. The position measuring arrangement further includes a decoding device for forming a first absolute measured position value from the scanning signals selected by the selection system when the first method of selection is applied to the selection system and a second absolute measured position value from the scanning signals selected by the selection system when the second method of selection is applied.

This object is also attained by the method for operating a position measuring arrangement that includes scanning an absolute code by an arrangement of scanning elements and selecting scanning signals from the arrangement of scanning elements by a first method of selection and a second method of selection different from the first method of selection. The method includes forming a first absolute measured position value from the scanning signals selected in accordance with the first method and forming a second absolute measured position value from the scanning signals selected in accordance with the second method. The method includes making the first absolute measured position value and the second absolute measured position value available for error checking.

An advantage of the present invention lies in particular in that it is possible in a simple manner to test the freedom from errors of the scanned code words, or generated measured position values and that, in case of the appearance of an error, it is possible to change into a dependable state of a drive unit whose absolute position is determined by the position measuring arrangement.

By the diversity of the selection function of scanning elements it is possible in an advantageous manner to use the hardware, which is provided for dependable scanning anyway, which minimizes costs and structural size.

Further characteristics and advantages of the present invention will become apparent in the course of the following description of an exemplary embodiment by the drawings.

DETAILED DESCRIPTION OF THE PREFERRED EMBODIMENTS

Figure 1:
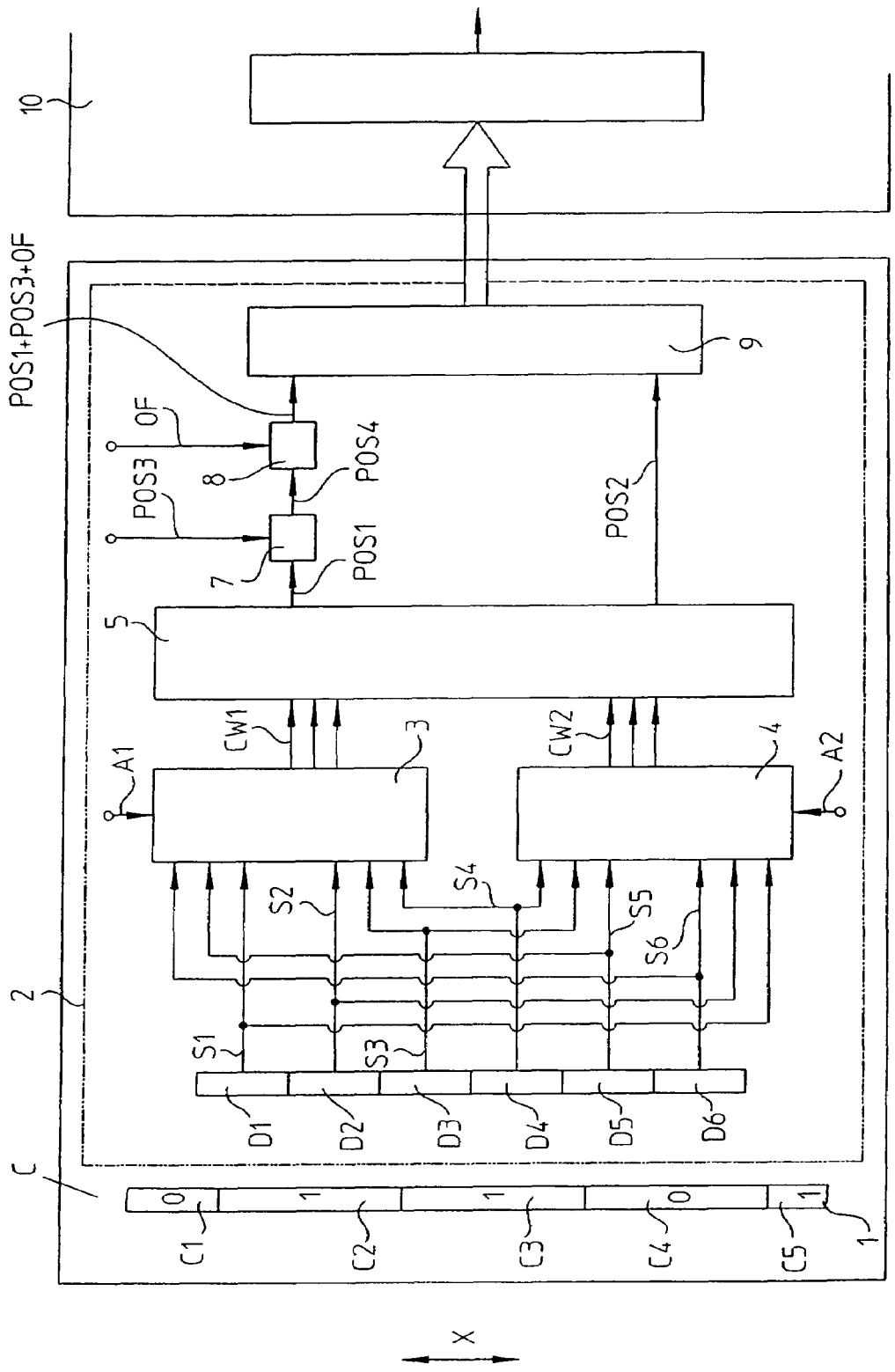
FIG. 1 is a first embodiment of an absolute position measuring arrangement in accordance with the present invention.

An absolute position measuring arrangement, designed in accordance with the present invention, is schematically represented in FIG. 1. This position measuring arrangement is a linear measuring arrangement, however, the present invention can also be employed in connection with angle-measuring arrangements.

For position measuring, a code C of a scale 1 is arranged to be movable with respect to a scanning device 2. For measuring lengths, the scale 1 is embodied in a rod or tape shape, and for measuring angles the scale is embodied in the shape of a drum or disk.

Figure 2:
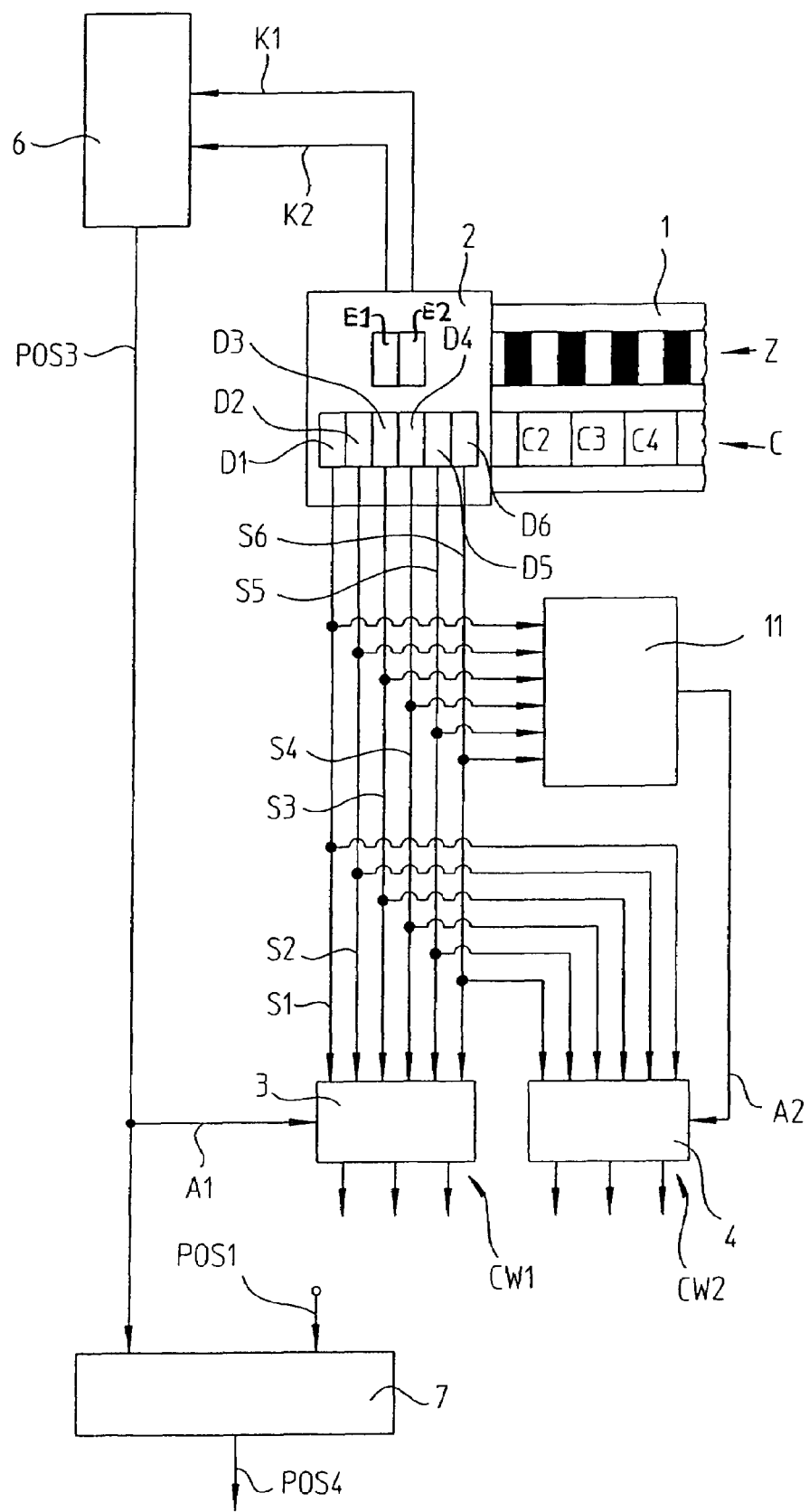
FIG. 2 shows a first embodiment of a position measuring arrangement to be used with the absolute position measuring arrangement of FIG. 1 in accordance with the present invention.

The code C is arranged on a track and includes code elements C1 to C5, which follow each other in the measuring direction X. These code elements C1 to C5 form a chain code, i.e. they are distributed pseudo-randomly in the measuring direction X and form a continuous sequence of different code words. In FIGS. 1 and 2 the code elements C1 to C5 are identified by 0 or 1. This identification symbolically characterizes the different physical properties of the individual code elements C1 to C5. If this is a code C which can be photo-electrically scanned, the code elements C1, C4 identified by 0 are not transparent, and the code elements C2, C3, C5 are transparent, or the code elements C1, C4 identified by 0 are non-reflecting and the code elements C2, C3, C5 are reflecting. The differing characteristics 0 and 1 can also be generated by the sequence of partial areas within a code element C1 to C5, as disclosed in WO 03/060431 A1, which will be explained later in greater detail by an example.

The scanning device 2 contains an arrangement of scanning elements D1 to D6 for scanning the code C. Several scanning elements D1 to D6 are respectively assigned to each code element C1 to C5, which means that the mean distance between the scanning elements D1 to D6 is a fraction of the length of a code element C1 to C5. The scanning signals S1 to S6 of the scanning elements D1 to D6 are supplied to a selecting system that can include a first selecting device 3 and a second selecting device 4. On the basis of first selection information A1, the selecting device 3 selects some of the scanning signals S1 to S6 for further processing and for forming a code word CW1. This code word CW1 is supplied to a decoding device 5 for forming a first absolute position POS1. Note that the selection information A1 can be thought of as a software instruction or switch control signal that controls which of the signals S1 to S6 are supplied to selecting device 3.

The scanning signals S1 to S6 of the scanning elements D1 to D6 are also supplied to the second selecting device 4. On the basis of a second selection information A2, this second selecting device 4 selects some of the scanning signals S1 to S6 for further processing and forming a code word CW2. This code word CW2 is supplied to the decoding device 5, or to a separate coding device (not represented), for forming a second absolute position POS2. Like selection information A1, selection information A2 can be thought of as a software instruction or switch control signal that controls which of the signals S1 to S6 are supplied to selecting device 4.

Decoding takes place either by a stored assignment table in which the corresponding measured position value POS1, POS2 is assigned to code words CW1 and CW2, respectively, or by a generator, which generates the code word sequence by an accompanying counter and which, when the generated code word agrees with the scanned code word CW, issues the setting of the counter as a measurement of the position. The latter version can be realized by a shift register.

The selection information A1 and A2 is determined in accordance with different criteria, therefore the selection takes place diversely. By the diversity of the selection it is assured that faulty scanning is detected even in the absence of complete hardware redundancy of the scanning process. For detecting this error, in the simplest case the two positions POS1 and POS2 are checked for equality, and an error signal is generated in case of inequality.

The selection of scanning signals S1 to S6 assures that only definite scanning signals, such as S2, S4, S6, are used for forming the code words CW1, CW2 in each relative position of the scale 1 and the scanning device 2. In the example in accordance with FIG. 1, definite scanning signals S2, S4, S6 are only generated by the scanning elements D2, D4, D6, which clearly respectively scan only a code element C2, C3, C4, i.e. the mean range of a code element C1 to C5. It is assured by the selection that uncertain scanning signals S1, S3, S5 are not used for further processing, i.e. for position determination. Those scanning signals S1, S3, S5 are uncertain, which are generated by the scanning elements D1, D3, D5 which scan the transition areas between respectively two code elements D1 to D5 which follow each other, i.e. are simultaneously affected by the physical state of two code elements C1 to C5.

A particularly advantageous further processing of the first absolute position POS1 and the second absolute position POS2 will be explained by FIG. 1. In order to also include the interface 9, in particular a serial one, and the transmission between the position measuring arrangement and a follow-up unit 10 in the test for correctness, both measured absolute position values POS1 and POS2 are transmitted to the follow-up unit 10, for example a numeric control, or a drive unit, and the comparison for the purpose of checking for errors takes place only then.

In this case it is advantageous if at least one of the measured absolute position values POS1 and POS2 is altered prior to transmission in such a way that the two values transmitted via the interface 9 are different. In the simplest case a known offset OF is imposed on one of the measured absolute position values POS1, POS2 in a changing unit 8, and can then again be taken into consideration during the comparison in the follow-up unit 10. The offset OF is an arbitrarily determined by a known algorithm, wherein the follow-up unit 10 is aware of the algorithm used. The offset OF is imposed on one of the absolute position values to ensure that the position values transmitted are different and to heighten the chance that any errors caused by transmission of the two values are detected by the follow-up unit 10.

In many cases, the resolution of the absolute position measurement by the code C alone is not sufficient for a highly accurate position measurement. For this reason several possibilities exist for complementing the absolute position POS1 with a higher-resolving measured position value POS3. This higher-resolving measured position value POS3 can be obtained in different ways, for example directly from the code C itself, in which the position of the edges of the code elements C1 to C5 (transitions) in regard to the scanning elements D1 to D6 is evaluated in addition, and a periodic incremental signal is obtained from this, which is interpolated in a known manner. A further possibility for obtaining a higher-resolving measured position value POS3 includes using additional information Z is arranged parallel with the code C, for example in the form of one or several incremental tracks (FIG. 2).

This higher-resolving measured position value POS3 is linked with at least one of the absolute measured position values POS1, POS2, and the resultant absolute measured position value POS4 obtained from this, charged with the offset OF as a value (POS1+POS3+OF), is transmitted to the follow-up unit 10. The resultant absolute measured position value POS4 is composed of a sequence of bits, of which the lesser value bits obtained by the higher-resolving position measurement further resolve the absolute measured position value POS1. If the higher-resolving measured position value POS3 is only linked with one of the absolute measured position values POS1, only the bits with the same resolution are compared with each other. For example, suppose POS1=010, POS2=010, POS3=011 and POS4=POS1+POS3=010011. When comparing POS4 with POS2 only the first three bits of POS4 (010) are compared with the three bits 010 of POS2.

Possibilities for forming the selection information A1 and A2 will now be explained in what follows.

A first exemplary embodiment for generating the selection information A1, A2 will be explained in greater detail by FIG. 2. In this example the scale 1 has also a piece of additional information Z, besides the code C. This additional information Z on the scale 1 is arranged parallel with the code C, and by scanning the additional information Z with detector elements E1, E2 a position POS3 is obtained from it, which divides a code element C1 to C5 into several sections, i.e. definitely defines the absolute position POS3 within a code element C1 to C5. This additional information is, for example, an incremental graduation with a graduation period corresponding to the width of one code element C1 to C5. Scanning signals K1, K2, which are phase-shifted with respect to each other, are generated by scanning the incremental graduation having the additional information Z via detector elements E1, E2, from which the absolute position POS3 within a graduation period is calculated in an interpolation unit 6. Because the position of the incremental graduation is fixedly assigned to the code elements C1 to C5, it is therefore possible to determine the exact position of the scanning device 2 with respect to the scale 1, and therefore the exact position of the scanning elements D1 to D6 with respect to the code elements C1 to C5, and this absolutely definitely within a respective code element C1 to C5. Based on receiving absolute position POS3, selection device 3 selects only those signals S1 to S6 which are derived from the center of code elements C1 to C4 to be processed. Thus, POS3 is the selection information A1. On the one hand, this absolute position POS3 complements the position value POS1 in that a resultant absolute measured position value POS4 is formed in a logical connecting device 7, known per se, and on the other hand it constitutes the selection information A1. Such a selection method is also described in DE 39 42 625 A1 and DE 42 09 629 A1.

In accordance with the present invention, a further selection is now performed diversely. In the example in accordance with FIG. 2, the further selection is performed with the aid of the code C itself. This is graphically explained by FIGS. 4 and 5. The code elements C1, C2, C3 (only three are shown for reasons of space) each includes two partial areas A and B of equal length, which are arranged following each other immediately in the measuring direction X. The partial areas A and B of a code element C1, C2, C3 are embodied complementary to each other, this means that they have inverse properties, i.e. in accordance with the optical scanning principle of FIG. 4 they are transparent and non-transparent, or in case of incident light scanning, are reflecting or non-reflecting.

In order to generate a digital value, or a bit, for each code element C1 to C3, the scanning signals S1 to S12 of the two partial areas A, B of a respective code element C1 to C3 are compared with each other. In case of a displacement of the scanning device 2 with respect to the code C by the width, or the length, of a code element C1, C2, C3, a new code word is generated, and a multitude of different code words is formed over the measuring range which is to be absolutely measured.

Figure 4:
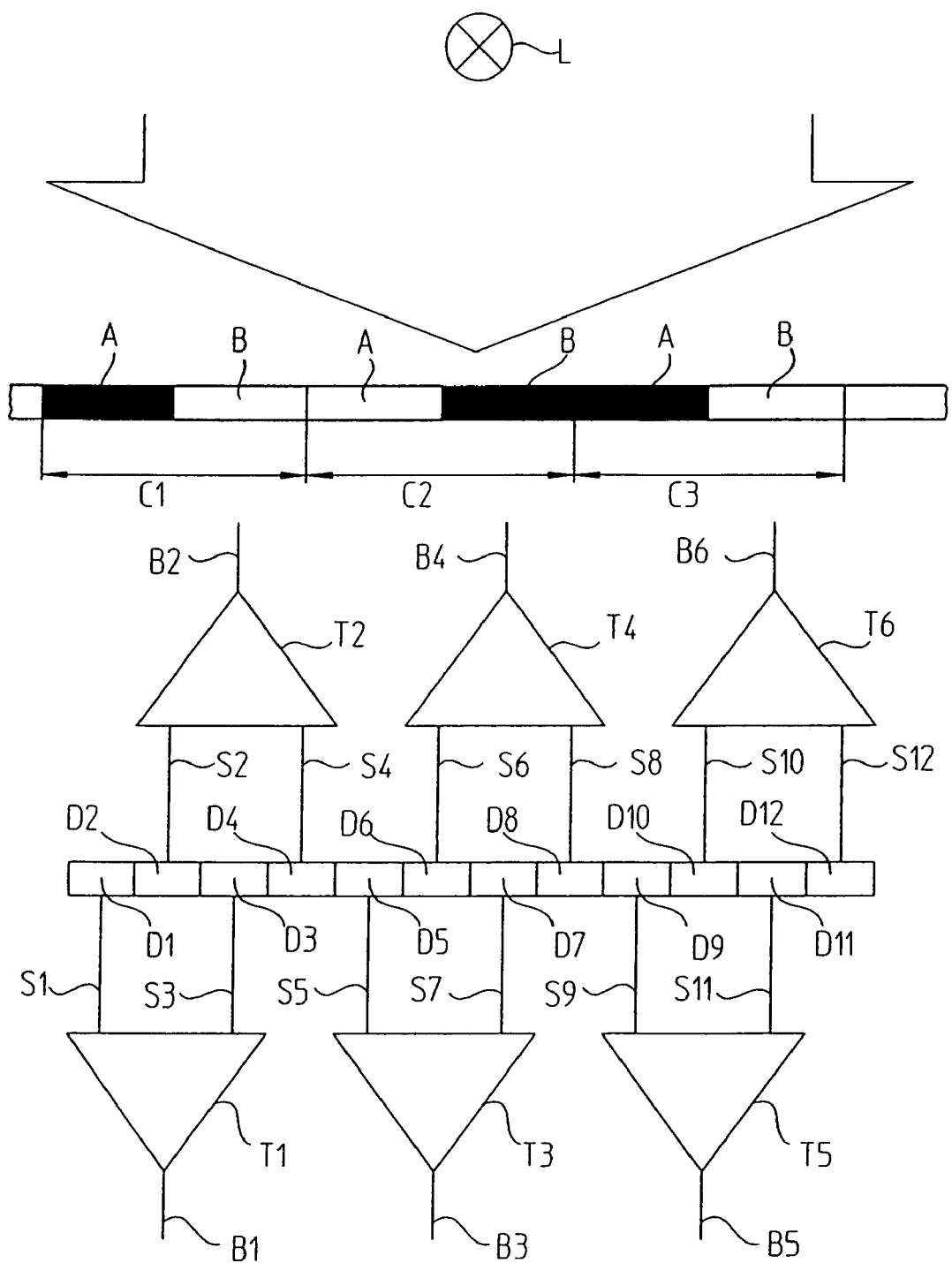
FIG. 4 represents the scanning of a code in detail using the position measuring arrangements of FIGS. 1 and 2.

FIG. 4 shows an instantaneous position of the code C in relation to the scanning device 2. The scanning elements D1 to D12 are arranged in sequence at a mean distance of half the width of a partial area A, B of the code C. It is assured by this that in every position at least one scanning element D1 to D12 is definitely assigned to a partial area A, B of a code element C1, C2, C3 and does not scan a transition between two partial areas A, B. In the position represented, the partial area C1, A is scanned by the scanning element D1 and the partial area C1, B by the scanning element D3. The scanning elements D1, D3 detect the light distribution and, as a function of the light intensity, generate an analog scanning signal S1, S3 proportionally to the light intensity. Since the two partial areas C1, A and C1, B are embodied complementary to each other, the light intensity of the scanning signals S1 and S3 is inverse with respect to each other, therefore the signal levels are spaced far apart from each other.

This signal distance is now used for generating the binary information B1 by checking which of the two scanning signals S1, S3 of the code element C1 is stronger. This check can be performed by forming a quotient or by forming a difference. Difference formation is employed in connection with the example, wherein in accordance with FIG. 4 a trigger module T1 is used as the comparison device. The trigger module T1 generates B1=0, when S1 is less than S3, and B1=1, when S1 is greater than S3. Binary information B2 to B6 is obtained in the same way by scanning the code elements C2, C3 and comparing the analog scanning signals S1 to S12 by means of trigger modules T1 to T6. For reasons of space, not all comparison elements (trigger modules) have been represented in FIG. 4, therefore in actuality the scanning signals S3 of the scanning element D3 are compared with the scanning signal S5 of the scanning element D7, S4 with S6, S7 with S9, S8 with S10, etc.

Therefore a first digital value is assigned to a first sequence of the partial areas A, B, designed to complement each other, and a second digital value to a second sequence of the partial areas A, B, designed to complement each other. In the example, the value 0 is assigned to the sequence of opaque—transparent, and the value 1 to the sequence transparent-opaque.

Since the two partial areas A, B of each code element C1, C2, C3 complement each other, the interference distance between the scanning signals S1 to S12 is very large. A change in the light intensity of the light source L affects the scanning signals S1 to S12 of both partial areas A, B equally.

Based on the complementary design of each of the two partial areas A, B of a code element C1, C2, C3, respective analog scanning signals S1 to S12, whose difference exceeds a predetermined value, must be generated by scanning these partial areas A, B in the course of the correct operation of the position measuring arrangement. A satisfactory error check is possible by observing this difference value. The basis of this error check is that it can be assumed that, when the difference value falls below a predetermined amount, the binary information B1 to B6 is uncertain, so that therefore an error signal F is generated with respect to this binary information B1 to B6.

Figure 5:
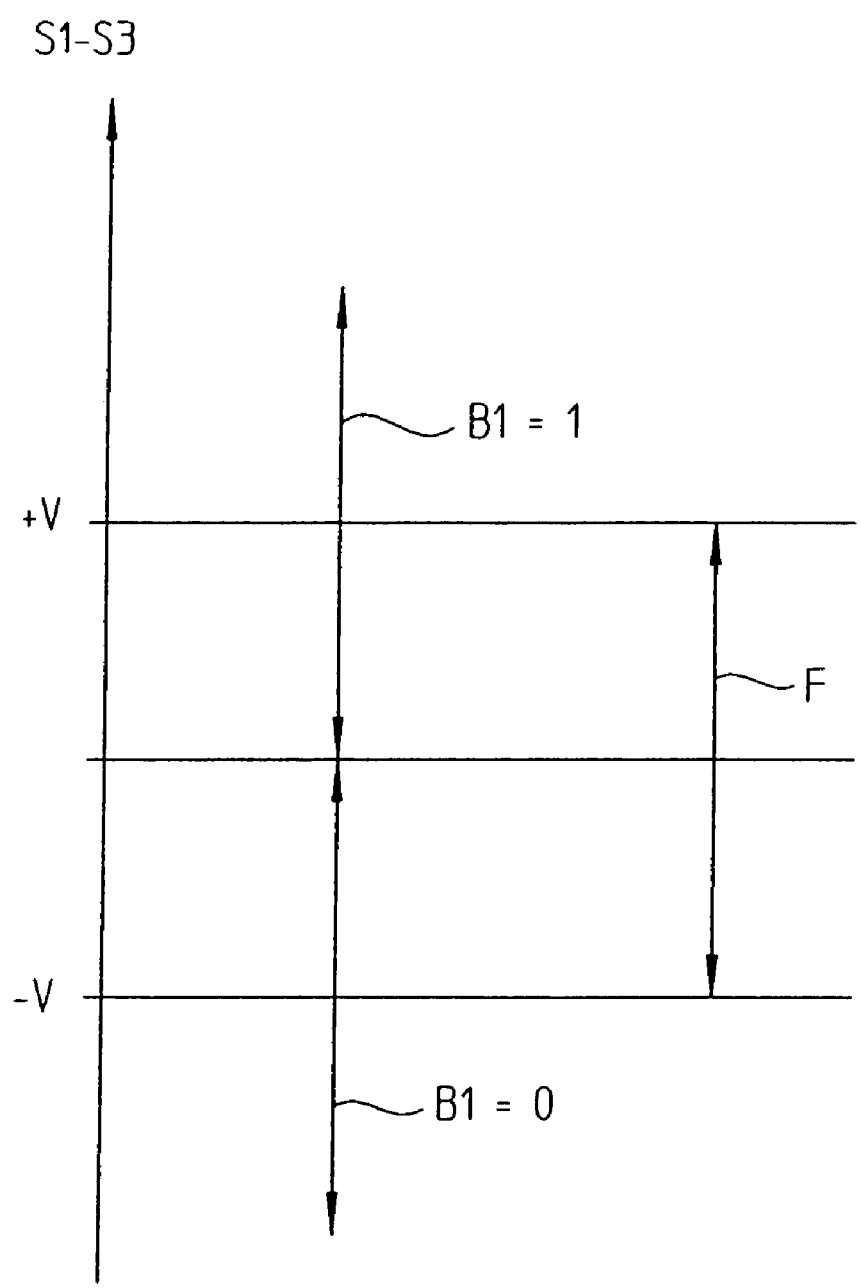
FIG. 5 shows a signal diagram associated with the position measuring arrangements of FIGS. 1, 2 and 4.

By forming the difference (S1−S3) of the analog scanning signals S1 and S3 of the code element C1 a check is made whether the difference amount exceeds, or does not exceed, a predetermined comparison value V. If the difference amount (S1−S3) does not exceed the predetermined comparison value V, an error signal F is issued. These signal conditions are represented in FIG. 5.

The arrangement of the two partial areas A, B of each code element C1, C2, C3 which follow each other directly side-by-side in the measuring direction X has the advantage that the scanning elements D1 to D12 can be arranged side-by-side at a short distance in the measuring direction X, so that therefore the position measuring arrangement is insensitive to twisting of the scanning device 2 with respect to the code C, i.e. to Moiré fluctuations.

Furthermore, sensitivity to dirt is low, since it can be assumed that both partial areas A and B of a code element C1, C2, C3 would be equally affected.

It can easily be seen in connection with the example of the scanning elements D1 and D2 in FIG. 4 that in the instantaneous position represented the even-numbered scanning elements D2, D4, D6, D8, D10, D12 are respectively located at a transition between two partial areas A, B, and therefore the trigger modules T2, T4, T6 do not provide correct binary information B2, B4, B6 assigned to a code element C1, C2, C3.

In what follows, measures will be explained by which it is to be assured that the correct scanning elements D1 to D12 are employed for code word generation, i.e. those scanning elements D1 to D12 which respectively scan the partial areas A, B of a single code element C1, C2, C3.

For the selection of code elements D1 to D12, which respectively scan a partial area A, B of the code elements C1 to C3 dependably and definitely, or of the scanning signals S1 to S12 generated by them, the scanning elements D1 to D12, which are spaced apart from each other at the distance of the length of a partial area A, B, are compared with each other. In accordance with FIG. 4, this comparison is performed by comparison elements T1 to T6 which, as a function of the difference of the incoming signals, give out an error signal F and/or a binary value B1 to B6=0 or 1. The comparison results of the scanning elements D1 to D12, which are arranged in a pattern corresponding to the length of a code element C1, C2, C3, constitute a group. Now those scanning elements D1 to D12 of a group are selected, whose sequence contains the fewest error signals F. In FIG. 4 the even-numbered scanning elements constitute a group, and the odd-numbered scanning elements a further group. In the relative position represented, the odd-numbered scanning elements D1, D3, D5, D7, D9, D11 are selected, i.e. the output signals B1, B3, B5 (code word CW2) of the lower comparison elements T1, T3, T5. This described selection routine generates the second selection information A2 that is used to control the selection of scanning signals S1 to S6 selected by the selection devices of FIGS. 2 and 3. Thus, the scanning signals from a group of scanning elements, or scanning signals, are selected for further processing and for forming the measured position value POS2 by the second selection information A2.

The additional information Z does not necessarily have to be only one incremental graduation, it can also include several incremental graduations. In an advantageous manner the additional information Z includes a combination of absolute codings with an incremental graduation, single- or multi-track, or of an incremental graduation with an integrated marking, such as described in DE 102 44 234 A1. In this case, in an advantageous manner, as the additional information Z the incremental graduation can also have a shorter graduation period than the length of a code element C1 to C5, since the absolute coding, or the marking, is used for the determination of the definite absolute position POS3 within a code element C1 to C5.

Obtaining the first selection information A1 from an additional information Z, which is arranged parallel with the code C, and obtaining the second selection information A2 from the code C, has the advantage that both types of selection information A1, A2 are obtained from different locations of the scale 1. No additional hardware redundancy is required for this, because this additional information Z is simultaneously used for obtaining a measured position value POS3, which complements the absolute measured position value POS1.

Figure 3:
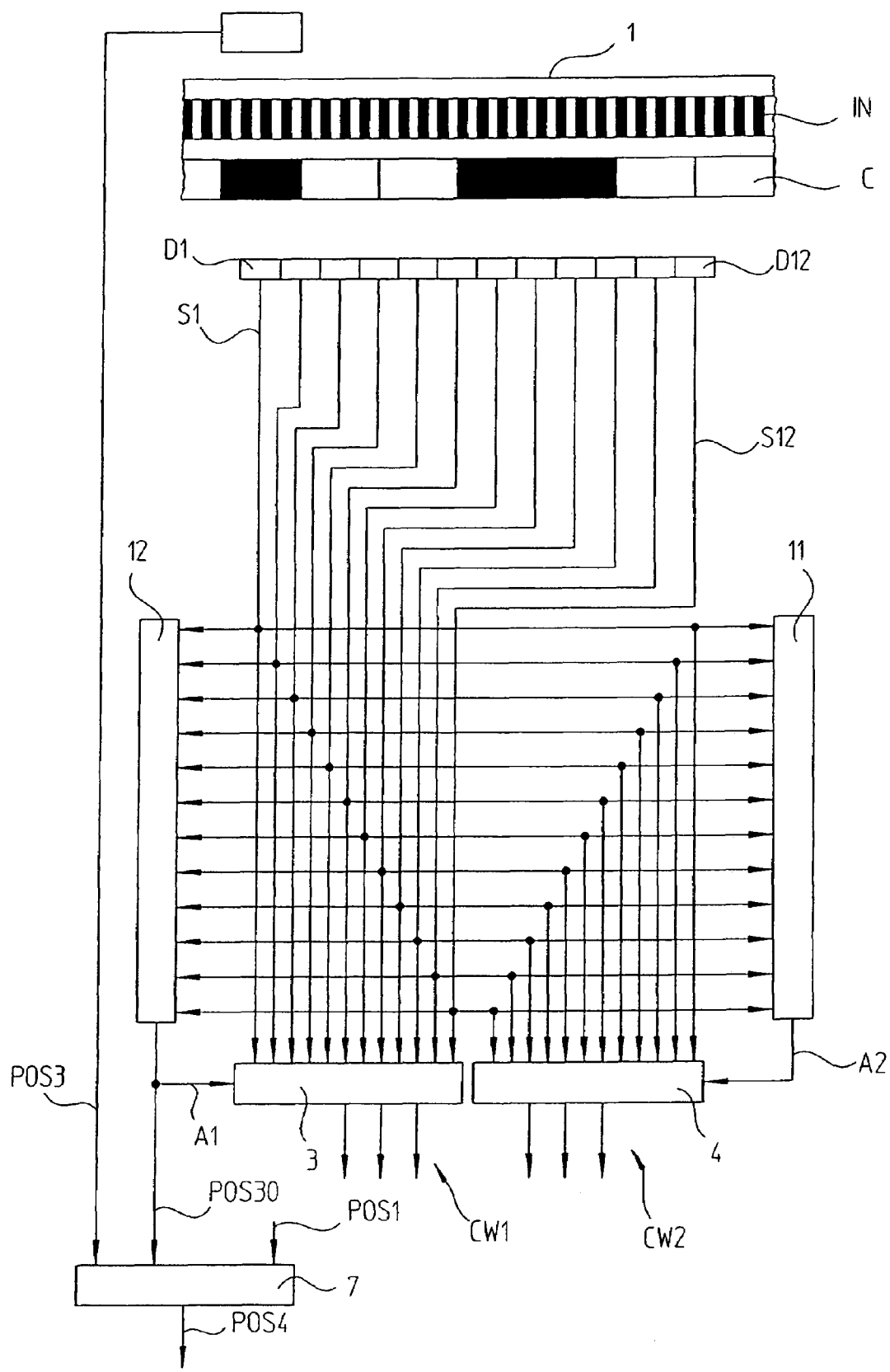
FIG. 3 shows a second embodiment of a position measuring arrangement to be used with the absolute position measuring arrangement of FIG. 1 in accordance with the present invention.

A further exemplary embodiment is represented in FIG. 3. Components with the same effect are provided with the same reference symbols in all figures. Differing from the above described explanations of the present invention, here the incremental graduation IN is only used for complementing the measured position value POS1 from the coding C. As described above, and here schematically represented in the form of the module 11, the second selection information A2 is obtained directly from the code by forming the difference from scanning signals S1 to S12 of the partial areas A, B of the code elements C1 to C3. The first selection information is also obtained from the code C, but in accordance with different criteria, namely by evaluating the edges (transitions) of partial areas A, B of the code elements C1 to C3 which follow each other. The module 12 for obtaining the selection signal A1 is also only schematically indicated. Here, use is made of the fact that each code element C1 to C3 includes a sequence of partial areas A, B, which are designed inversely with respect to each other and therefore has an edge in the shape of a transition from a physical property to an inverse physical property. These edges are arranged in a constant pattern corresponding to the length of a code element C1 to C3, so that a periodic signal can be obtained therefrom, which is interpolated in a known manner, and from this a measured position value POS3 is obtained, which absolutely divides the length of a code element C1 to C3. Reference is made in connection with this to WO 02/01160 A1, for example. The relatively roughly resolving measured position value POS1, and the further resolving measured position value POS2, as well as the finely resolving measured position value POS3, are linked together in the logical connecting device 7 into the resultant absolute measured position value POS4.

The present invention can be employed in connection with photo-electric scanning, as well as other scanning types, for example magnetic, capacitive and inductive.

The foregoing description is provided to illustrate the invention, and is not to be construed as a limitation. Numerous additions, substitutions and other changes can be made to the invention without departing from its scope as set forth in the appended claims.

We claim:
1. A position measuring arrangement, comprising:
an arrangement of scanning elements for scanning an absolute code;
a selection system for selecting scanning signals from said arrangement of scanning elements by a first method of selection and a second method of selection different from said first method of selection; and
a decoding device for forming a first absolute measured position value from said scanning signals selected by said selection system when said first method of selection is applied to said selection system and a second absolute measured position value from said scanning signals selected by said selection system when said second method of selection is applied.

2. The position measuring arrangement in accordance with claim 1, wherein said selection system comprises a first selection device and a second selection device, and
wherein an additional information is arranged parallel with said code and is scanned so as to generate scanning signals that are made available at said first selection device and from which a first selection information, and second selection information derived from said scanning signals of said absolute code is available at said second selection device.

3. The position measuring arrangement in accordance with claim 2, wherein said code comprises a sequence of code elements arranged one behind the other in a measuring direction, wherein each of said code elements comprises a first partial area and a second partial area which is complementary to said first partial area;
a mean distance between said arrangement of scanning elements which follow each other is less than a length of said first partial area;
respective scanning signals, from said arrangement of scanning elements having a mutual mean distance corresponding to said length of said first partial area, are respectively supplied to a comparison device which forms a comparison between said respective scanning signals and forms binary information, as a function of said comparison, for said code element.

4. The position measuring arrangement in accordance with claim 3, wherein said comparison device is laid out for comparing a difference of said scanning signals with a nominal difference and for issuing an error signal when said nominal difference is downwardly exceeded.

5. The position measuring arrangement in accordance with claim 4, wherein said second selection device selects said scanning signals from a group of said arrangement of scanning elements which are arranged at a mutual mean distance corresponding to said length of said first partial area, wherein said selection is based on determining which of said arrangement of scanning elements put out the fewest error signals.

6. The position measuring arrangement in accordance with claim 1, wherein said selection system comprises a first selection device and a second selection device, and wherein said first selection device is supplied with a first selection information, which is derived from said scanning signals, and said second selection device is supplied with a second selection information, which is also derived from said scanning signals of said absolute code.

7. The position measuring arrangement in accordance with claim 1, wherein said first absolute measured position value and said second absolute measured position value are present at an interface for being transmitted to an external follow-up unit.

8. The position measuring arrangement in accordance with claim 7, further comprising a changing unit, which is supplied with said first absolute measured position values in order to change said first absolute measured position values in such a way that said changed first absolute measured position values and said second absolute measured position values which are present at said interface for transmission to said external follow-up unit are different from one another.

9. A method for operating an absolute position measuring arrangement, the method comprising:
scanning an absolute code by an arrangement of scanning elements;
selecting scanning signals from said arrangement of scanning elements by a first method of selection and a second method of selection different from said first method of selection;
forming a first absolute measured position value from said scanning signals selected in accordance with said first method;
forming a second absolute measured position value from said scanning signals selected in accordance with said second method; and
making said first absolute measured position value and said second absolute measured position value available for error checking.

10. The method in accordance with claim 9, wherein said first method of selection takes place as a function of a first selection information, which is obtained by scanning an additional information arranged parallel to said code, and said second method of selection takes place on the basis of a second selection information which is obtained by scanning said code.

11. The method in accordance with claim 9, wherein said first method of selection takes place as a function of a first selection information, which is obtained by scanning said code, and said second method of selection is based on a second selection information which is also obtained by scanning said code.

12. The method in accordance with claim 9, wherein said first absolute measured position value and said second absolute measured position value are compared with each other for an error check.

13. The method in accordance with claim 12, wherein said first absolute measured position value and said second absolute measured position value are transmitted to a follow-up unit.

14. The method in accordance with claim 13, wherein prior to transmission of said first absolute measured position values to said follow-up unit, said first absolute measured position value is changed in such a way that said transmitted second absolute measured position value and said changed first absolute measured position value are different.

15. The method in accordance with claim 9, further comprising:
wherein said absolute code comprises a sequence of code elements arranged one behind the other in a measuring direction, wherein said each of said code elements comprises partial areas which are complementary to each other; and
generating said scanning signals from said arrangement of scanning elements, which are arranged at a mutual mean distance of less than a length of one of said partial areas; and
supplying respectively two of said scanning signals from said scanning elements, which are arranged corresponding to said length of said one of said partial areas, to a comparison device, which compares said two of said scanning signals and forms binary information for said code elements as a function of said comparison.

16. The method in accordance with claim 15, wherein a comparison value from said comparison is compared with a nominal value and, in case of a deviation from said nominal value, an error signal is formed.

17. The method in accordance with claim 16, wherein said second method of selecting scanning signals from said arrangement of scanning elements comprises selecting those scanning signals that are generated from pairs of said arrangement of said scanning elements arranged in a pattern corresponding to a length of a code element of said absolute code and that generate the least errors by said error checking.

* * * * *

UNITED STATES PATENT AND TRADEMARK OFFICE
CERTIFICATE OF CORRECTION

PATENT NO.        : 7,461,464 B2
APPLICATION NO.   : 11/704511
DATED             : December 9, 2008
INVENTOR(S)       : Rudolf Mittmann et al.

It is certified that error appears in the above-identified patent and that said Letters Patent is hereby corrected as shown below:

On the Title Page

In item (73), before "Johannes Heidenhain" insert --Dr.--.

Signed and Sealed this

Sixteenth Day of June, 2009

JOHN DOLL
*Acting Director of the United States Patent and Trademark Office*